United States Patent Office 2,798,386
Patented July 9, 1957

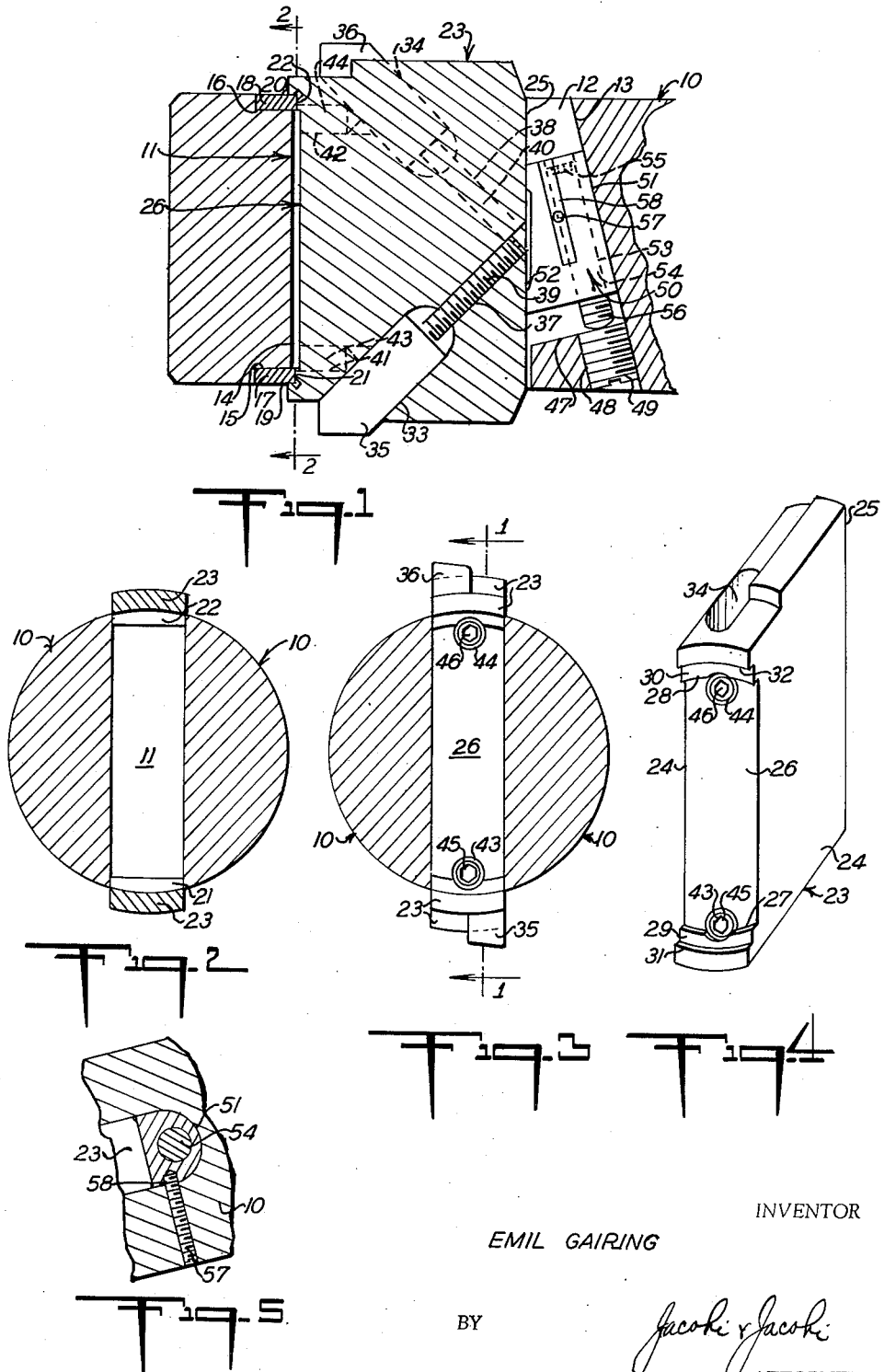

2,798,386
BORING BAR WITH REMOVABLE CUTTER BODY AND LOCKING AND LOCATING MEANS THEREFOR

Emil Gairing, Waukesha, Wis.

Application February 21, 1955, Serial No. 489,720

5 Claims. (Cl. 77—56)

This invention relates to machine tools and more particularly to a boring bar incorporating a removable cutter body, which body may serve to support one or more cutter bits, the boring bar also being provided with means for accurately locating the cutter body therein and with means for locking the cutter body in position.

Heretofore many types of boring bars have been utilized, some of these being of the solid type in which the cutter is ground from the material of the bar itself and others in which a removable bit is clamped or otherwise secured in the boring bar. Likewise numerous prior art cutter bars have incorporated a removable body which serves to support a cutter bit, but these cutter bodies have in general been secured in place by set screws or other equivalent means which resulted in inaccuracies, and also the necessary threaded holes for receiving the set screws materially weakened the boring bar. Also, in many cases these prior art devices did not permit accurate setting of the cutter bits prior to assembly of the same with the boring bar since such assembly could not be accurately accomplished, and consequently any pre-adjustment of the cutter bits was destroyed. Another disadvantage of the prior art boring bars was the necesity for providing extremely accurate recesses or apertures therein to receive the cutter bodies; and also, unless extreme accuracy was maintained, severe chattering or vibration resulted. Where one of the various hard metal alloys such as tungsten carbide was utilized for cutter bits, fatigue and breakage thereof often occurred after only a short period of use. Since these hard metal alloys are relatively expensive, any breakage thereof resulted in high cost of repair or replacement and also resulted in a material loss of machining time which reflected in prohibitive maintenance costs.

Aside from the difficulty of accurately positioning the cutter blocks or bodies in the prior art boring bars, there was also the problem of maintaining such bodies in adjustment or in accurate position and in many cases such adjustment was destroyed as soon as a heavy cut was undertaken. Also, the cutter blocks frequently became jammed in place and it was consequently exceedingly difficult to remove the same and in some instances this resulted in sufficient damage to the opening or recess in the boring bar that the accuracy of the same was destroyed and replacement became necessary.

It is accordingly an object of the invention to provide a boring bar incorporating a removable cutter body which may support one or more cutter bits, and which body may be accurately located and removably locked in place.

A further object of the invention is the provision of a boring bar incorporating a removable cutter block and in which accurate machining operations in a recess or opening in the bar are eliminated, it only being necessary to accurately machine two hardened metal aligning plates.

A still further object of the invention is the provision of a boring bar incorporating a removable cutter body which may be removed and replaced without in any way destroying the accuracy of the cutter bit setting or the over-all accuracy of the boring bar.

Another object of the invention is the provision of a boring bar incorporating a removable cutter body which may be securely locked in place and in which the locking mechanism may be conveniently actuated to accomplish the locking function or to permit removal of the cutter body and also in which, in the event the locking mechanism is damaged or destroyed, the cutter body may still be conveniently removed.

A further object of the invention is the provision of a boring bar incorporating a removable cutter body and in which chattering or vibration of the cutter body is completely prevented.

A still further object of the invention is the provision of a boring bar incorporating a removable cutter body in which two accurately machined locating surfaces are employed and in which the mechanism for locking the cutter body in place also acts to hold the same in firm engagement with such locating surfaces, thereby providing extreme accuracy which may be duplicated upon removal and replacement of the cutter body.

Another object of the invention is the provision of a boring bar incorporating a removable cutter body which may be economically manufactured with a minimum of close tolerance machining operations and requiring no specialized machine tools for the manufacture thereof.

Further objects and advantages of the invention will be apparent from the following description taken in conjunction with the accompanying drawing wherein:

Fig. 1 is a sectional view taken substantially on the line 1—1 of Fig. 3 and showing the cutter body in place and the means for removably securing the cutter body in firm, accurately located position;

Fig. 2, a sectional view on the line 2—2 of Fig. 1 and showing the hardened aligning plates or pads which are inserted in the boring bar;

Fig. 3, a side elevational view with certain parts in section for greater clarity and showing the end of the cutter body including the locating surfaces for engaging the aligning plates or pads as well as the set screws for clamping the cutter bits in operative position;

Fig. 4, a perspective view showing the cutter body with the cutter bits removed therefrom; and Fig. 5, a fragmentary sectional view showing the locking mechanism and the means for maintaining the same in place in a recess in the boring bar.

With continued reference to the drawing there is shown an elongated boring bar 10 which preferably is of circular cross section, but other cross sections may if desired be utilized. Bar 10 is provided at any point desired in the length thereof with an elongated diametrically disposed slot 11 extending entirely through the bar 10. Communicating with the slot 11 is a recess 12 which may be provided with a rear wall 13 inclined with respect to the slot 11, and the purpose of this recess 12 and inclined rear wall 13 will be later described.

The wall 14 of the slot 11 is provided at each outer end with a recess 15 and 16 in which are positioned aligning plates or pads 17 and 18. These plates or pads 17 and 18 may be formed of hardened steel or may be formed of one of the well-known hard metal alloys, several of which may be suitable for the purpose. The plates or pads 17 and 18 are secured firmly in the recesses 15 and 16 by welding, brazing or any other suitable method and subsequently the outer surfaces 19 and 20 are accurately ground to circular cross section, preferably of the same diameter as the boring bar 10. It is also to be noted that the inner ends 21 and 22 of the pads 17 and 18 project inwardly of the wall 14 into the slot 11 and the inner surfaces of these end portions 21 and 22 are accurately ground to a surface perpendicular to the axis of the boring bar 10.

A cutter body 23 is provided and as best shown in Figs. 1 and 4 this cutter body 23 may be generally of the same size and configuration as the slot 11 in the boring bar 10. The body 23 is, however, slightly longer than the slot 11 for a purpose to be presently described. The cutter body 23 is of a thickness to be slidably received in the slot 11 and this body 23 is provided with substantially parallel side walls or surfaces 24, a substantially straight rear end surface 25 and a recessed front end surface 26.

The front end surface 26 terminates at each outer end thereof in a shoulder 27 and 28 from which extends a ground surface 29 and 30 perpendicular to the longitudinal axis of the body 23 when disposed in the slot 11 in the boring bar 10. Surfaces 29 and 30 terminate in arcuate shoulders 31 and 32 which are opposed to each other and are ground to a diameter substantially equal to the outer diameter of aligning plates or pads 17 and 18. The arcuate shoulders 31 and 32 thus provide lands which are adapted to snugly engage the arcuate surfaces 19 and 20 on the pads 17 and 18 in a manner to be presently described. Likewise the perpendicular surfaces 29 and 30 are adapted to engage the perpendicular end surfaces 21 and 22 on the aligning plates or pads 17 and 18.

The cutter body 23 as best shown in Figs. 1 and 4 is provided with angularly disposed outwardly extending bores 33 and 34 which are adapted to slidably receive cutter bits 35 and 36 respectively. These cutter bits 35 and 36 may be formed of hardened tool steel or if desired may be tipped with any one of the well-known hard metal alloys commonly used for such purposes. The cutter bits 35 and 36 are complementary to the shape of the bores 33 and 34 and are slidably received therein and, as shown in Fig. 1, project diametrically from opposite sides of the cutter body 23. Extending from the bores 33 and 34 to the rear wall or end surface 25 of the cutter body 23 are reduced bores 37 and 38 which serve to threadedly receive adjusting screws 39 and 40 which abut the inner ends of cutter bits 35 and 36 and prevent retraction thereof into the bores 33 and 34 beyond a predetermined distance. Adjustment of the screws 39 and 40 results in positioning the cutting edges of the bits 35 and 36 at a predetermined diameter which of course will result in machining a bore in a piece of wood to such diameter.

In order that the cutter bits 35 and 36 may be securely locked in adjusted position in the bores 33 and 34, there may be provided threaded bores 41 and 42 which extend from the outer end wall 26 of the body 23 to the bores 33 and 34. Set screws 43 and 44 may be threadedly received in the bores 41 and 42, and as shown in Figs. 3 and 4 set screws 43 and 44 may be provided with hexagonal sockets 45 and 46 in order to receive a conventional Allen wrench in order that the same may be tightened into firm engagement with the cutter bits 35 and 36 and hold the same securely in the bores 33 and 34 in adjusted position.

The recess 12 in the boring bar 10 which intersects the slot 11 is closed at one end by a wall 47 and threadedly received in a bore 48 in this wall is a screw threaded plug 49. The purpose of this plug will be presently described. Slidably mounted in the recess 12 is a cutter body locking block 50 which, as shown in Fig. 1, is tapered or wedge shape and this block 50 may be provided with a surface 51 engaging and cooperating with the inclined surface 13 of the recess 12 and the opposite surface 52 of the block 50 may engage and cooperate with the rear end surface 25 of the cutter body 23. The locking block 50 is provided with a bore 53 extending therethrough and this bore 53 may serve to threadedly receive a jack screw 54 which may be provided at its upper end with a hexagonal recess 55 for receiving an Allen wrench to actuate the same, and at the lower end 56 may engage the upper end of the screw threaded plug 49 positioned in the bore 48 in the end wall 47 of the recess 12. As above stated, the block 50 is slidable in the recess 12 and this block 50 is retained therein against inadvertent displacement by a set screw 57 extending through the boring bar 10 and engaging in a groove 58 provided in one side of the locking block 50.

From an inspection of Fig. 1 it will be noted that the slot 11 in the boring bar 10 is slightly longer than the total length of the cutter body 23 including the arcuate shoulders 31 and 32, and consequently in operation the cutter body 23 may be inserted in the slot 11 until the arcuate shoulders 31 and 32 are in alignment with the outer surfaces 19 and 20 of the aligning plates or pads 17 and 18, at which time the cutter body 23 may be moved longitudinally to bring the arcuate surfaces or shoulders 31 and 32 into firm engagement with the arcuate surfaces 19 and 20 on pads 17 and 18, and at the same time the perpendicular surfaces 29 and 30 will move into engagement with the perpendicular surfaces 21 and 22 on the pads 17 and 18. It is to be presumed that the cutter bits 35 and 36 have been previously adjusted to provide the desired diameter of cut and with the cutter body 23 positioned in the slot 11 as set forth above the jack screw 54 is actuated to bring end 56 thereof into engagement with the screw threaded plug 49, thus moving the locking block 50 upwardly as viewed in Fig. 1 which, due to the inclination of the wall 13 of the recess 12 will bring the surface 52 on the block 50 into engagement with the rear end surface 25 of the cutter body 23, thus moving the perpendicular surfaces 29 and 30 on the cutter body 23 into tight engagement with the perpendicular surfaces 21 and 22 on the pads 17 and 18. This serves to firmly and securely lock the cutter body 23 in position and, of course, the alignment of the same is accurately determined by the perpendicular surfaces 29 and 30 in engagement with the surfaces 21 and 22 and by engagement of the arcuate surfaces or shoulders 31 and 32 with the arcuate surfaces 19 and 20 on the pads 17 and 18. The boring bar may be operated in this condition until such time as it is desired to remove the cutter body 23 to permit sharpening or readjustment of the cutter bit 35 and 36. It is to be noted that the inclination of the wall 13 of the recess 12 is such that the taper is not sticky and consequently a mere reverse movement of the jack screw 54 will allow the locking block 50 to move downwardly, thus releasing the cutter body 23 to be removed from the slot 11.

It is noted that even though the thickness of the cutter body 23 may be slightly less than the width of the slot 11, that in operation the cutter body 23 will tend to rotate on the cylindrical surfaces 19 and 20 of the pads 17 and 18 until opposite sides of the cutter body 23 engage opposite sides of the slot 11. Since the pressure exerted by the cutter bits 35 and 36 is always in one direction, this will prevent chattering or vibration of the cutter body 23 which, if hard metal alloys were utilized as tips for cutter bits 35 and 36, might possibly result in damage thereto. Since these hard metal alloys are relatively costly, any structure which will prevent undue damage thereto is a well worth while step forward in the art.

Should the hexagonal socket 55 in the jack screw 54 become mutilated to such an extent that the screw cannot be rotated, or should the jack screw 54 break, it is only necessary to remove the screw threaded plug 49 which would then permit movement of the locking block 50, thus releasing the cutter body 23 for removal from the slot 11 in the boring bar 10. The locking block 50 could then be removed and the jack screw 54 repaired or replaced.

It will thus be seen that by the above described invention there has been provided a boring bar construction which includes a removable cutter body which may be conveniently and securely locked in accurate position in the boring bar and yet may be easily and conveniently removed for adjustment or sharpening of the cutter bits. Furthermore, the structure only requires accurate machining of the cooperating surfaces on the aligning plates or pads 17 and 18 and on the surfaces on the cutter body 23 cooperating therewith. The remainder of the machining operations may be of the ordinary finish variety without regard for unduly close tolerances. This reduction in the number of accurate machining operations materially contributes to the low cost and ease of manufacture and consequently permits production of the invention described above which, when combined with the ease and convenience of operation, result in extremely low cost machining operations.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A boring bar structure comprising an elongated bar of circular cross section, an elongated slot extending diametrically through said bar, aligning pads secured to said bar at opposite ends of one end wall of said slot and projecting into said slot, the circumferential surfaces of said pads having the same diameter as said bar and the projecting end surfaces of said pads being perpendicular to the axis of said bar, a recess in the opposite end wall of said slot, said recess having one end wall and a rear inclined wall confronting said slot, a screw threaded plug in the end wall of said recess, a tapered locking block slidably mounted in said recess, means for retaining said locking block in said recess and for limiting sliding movement thereof, a jack screw threadedly received in said locking block and engaging said plug, a cutter body removably disposed in said slot, means in said body for adjustably and removably securing a cutter bit therein, said cutter body comprising a block of greater length than the diameter of said bar and of slightly less width than the length of said slot, arcuate shoulders on one end of said body providing lands for engaging the circumferential surfaces of said pads and end surfaces on said body adjacent said lands for engaging the projecting end surfaces of said pads whereby upon insertion of said body in said slot with said surfaces in engagement and upon actuation of said jack screw to move said locking block into engagement with the opposite end surface of said body, said body will be accurately and removably locked in operative position in said bar.

2. A boring bar structure comprising an elongated bar, an elongated slot extending diametrically through said bar, aligning pads secured to said bar at opposite ends of one end wall of said slot and projecting into said slot, the circumferential surfaces of said pads being arcuate and the projecting end surfaces of said pads being perpendicular to the axis of said bar, a recess in the opposite end wall of said slot, said recess having one end wall and a rear inclined wall confronting said slot, a screw threaded plug in the end wall of said recess, a tapered locking block slidably mounted in said recess, means for retaining said locking block in said recess and for limiting sliding movement thereof, a jack screw threadedly received in said locking block and engaging said plug, a cutter body removably disposed in said slot, means in said body for adjustably and removably securing a cutter bit therein, said cutter body comprising a block of greater length than the diameter of said bar and of slightly less width than the length of said slot, arcuate shoulders on one end of said body providing lands for engaging the circumferential surfaces of said pads and end surfaces on said body adjacent said lands for engaging the projecting end surfaces of said pads whereby upon insertion of said body in said slot with said surfaces in engagement and upon actuation of said jack screw to move said locking block into engagement with the opposite end surfaces of said body, said body will be accurately and removably locked in operative position in said bar.

3. A boring bar structure comprising an elongated bar, an elongated slot extending diametrically through said bar, hard metal aligning pads secured to said bar at opposite ends of one end wall of said slot and projecting into said slot, the circumferential surfaces of said pads being arcuate and the projecting end surfaces of said pads being perpendicular to the axis of said bar, a recess in the opposite end wall of said slot, said recess having one end wall and a rear inclined wall confronting said slot, a screw threaded plug in the end wall of said recess, a tapered locking block slidably mounted in said recess, means for retaining said locking block in said recess and for limiting sliding movement thereof, a jack screw threadedly received in said locking block and engaging said plug, a cutter body removably disposed in said slot, means in said body for adjustably and removably securing a cutter bit therein, said cutter body comprising a block of greater length than the diameter of said bar and of slightly less width than the length of said slot, arcuate shoulders on one end of said body providing lands for engaging the circumferential surfaces of said pads and end surfaces on said body adjacent said lands for engaging the projecting end surfaces of said pads whereby upon insertion of said body in said slot with said surfaces in engagement and upon actuation of said jack screw to move said locking block into engagement with the opposite end surfaces of said body, said body will be accurately and removably locked in operative position in said bar.

4. A boring bar structure comprising an elongated bar, an elongated slot extending diametrically through said bar, aligning pads secured to said bar at opposite ends of one end wall of said slot and projecting into said slot, the circumferential surfaces of said pads being arcuate and the projecting end surfaces of said pads being perpendicular to the axis of said bar, a recess in the opposite end wall of said slot, said recess having one end wall and a rear inclined wall confronting said slot, a removable plug in the end wall of said recess, a tapered locking block slidably mounted in said recess, means for retaining said locking block in said recess and for limiting sliding movement thereof, a jack screw threadedly received in said locking block and engaging said plug, a cutter body removably disposed in said slot, means in said body for adjustably and removably securing a cutter bit therein, said cutter body comprising a block of greater length than the diameter of said bar and of slightly less width than the length of said slot, arcuate shoulders on one end of said body providing lands for engaging the circumferential surfaces of said pads and end surfaces on said body adjacent said lands for engaging the projecting end surfaces of said pads whereby upon insertion of said body in said slot with said surfaces in engagement and upon actuation of said jack screw to move said locking block into engagement with the opposite end surfaces of said body, said body will be accurately and removably locked in operative position in said bar.

5. A boring bar structure comprising an elongated bar, an elongated slot extending diametrically through said bar, aligning pads secured to said bar at opposite ends of one end wall of said slot and projecting into said slot, the circumferential surfaces of said pads being arcuate and the projecting end surfaces of said pads being perpendicular to the axis of said bar, a recess in the opposite end wall of said slot, said recess having one end wall and a rear inclined wall confronting said slot, a removable plug in the end wall of said recess, a tapered locking block slidably mounted in said recess, a jack screw threadedly received in said locking block and engaging said plug, a cutter body removably disposed in said slot, means in said body for adjustably and removably securing a cutter bit therein, said cutter body comprising a block of greater length than the diameter of said bar and of slightly less width than the length of said slot, arcuate shoulders on one end of said body providing lands for engaging the circumferential surfaces of said pads and end surfaces on said body adjacent said lands for engaging the projecting end surfaces of said pads whereby upon insertion of said body in said slot with said surfaces in engagement and upon actuation of said jack screw to move said locking block into engagement with the opposite end surfaces of said body, said body will be accurately and removably locked in operative position in said bar.

References Cited in the file of this patent

UNITED STATES PATENTS

| | | |
|---|---|---|
| 774,756 | Johnson | Nov. 15, 1904 |
| 931,883 | Muth et al. | Aug. 24, 1909 |
| 1,671,307 | Morgan | May 29, 1928 |